April 19, 1966    R. C. MACK ETAL    3,246,864
CONTROLLED FLIGHT AERIAL DEVICE WITH RETARDING ROTOR
Filed June 25, 1963    3 Sheets-Sheet 1
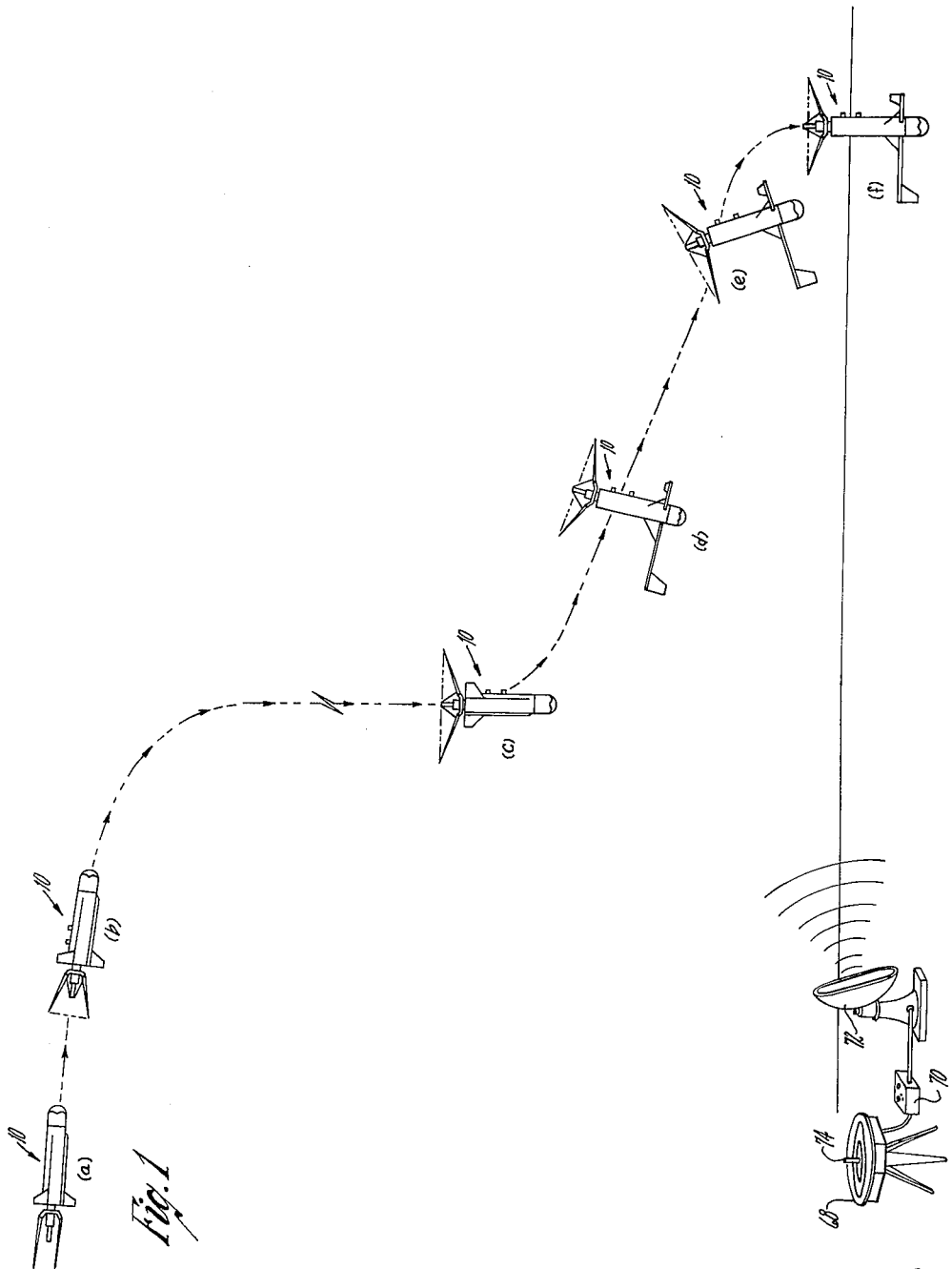
INVENTORS
ROBERT C. MACK
DONALD W. ROBINSON JR.
BRUCE A. GOODALE
BY McCormick, Paulding & Huber
ATTORNEYS

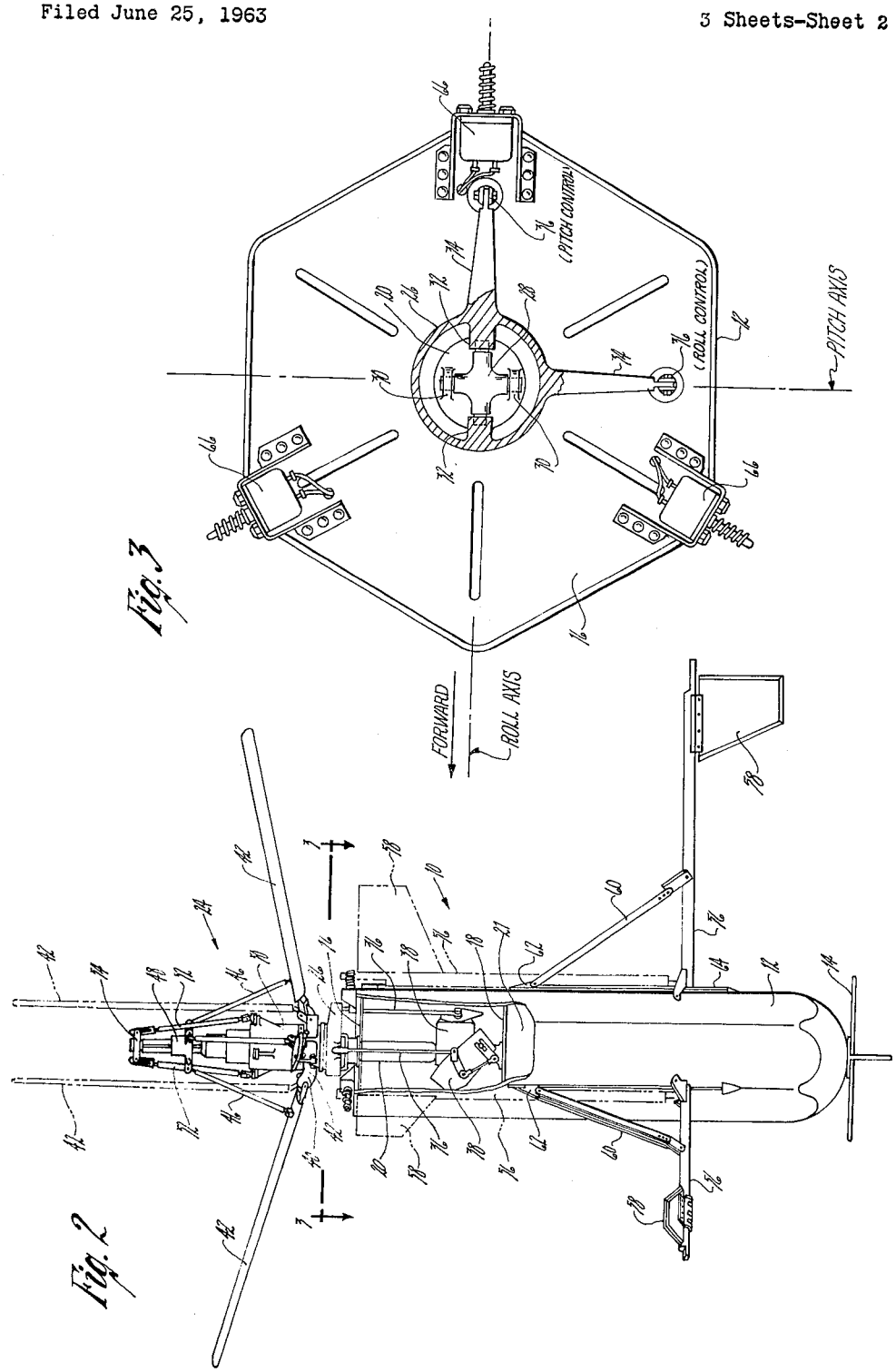

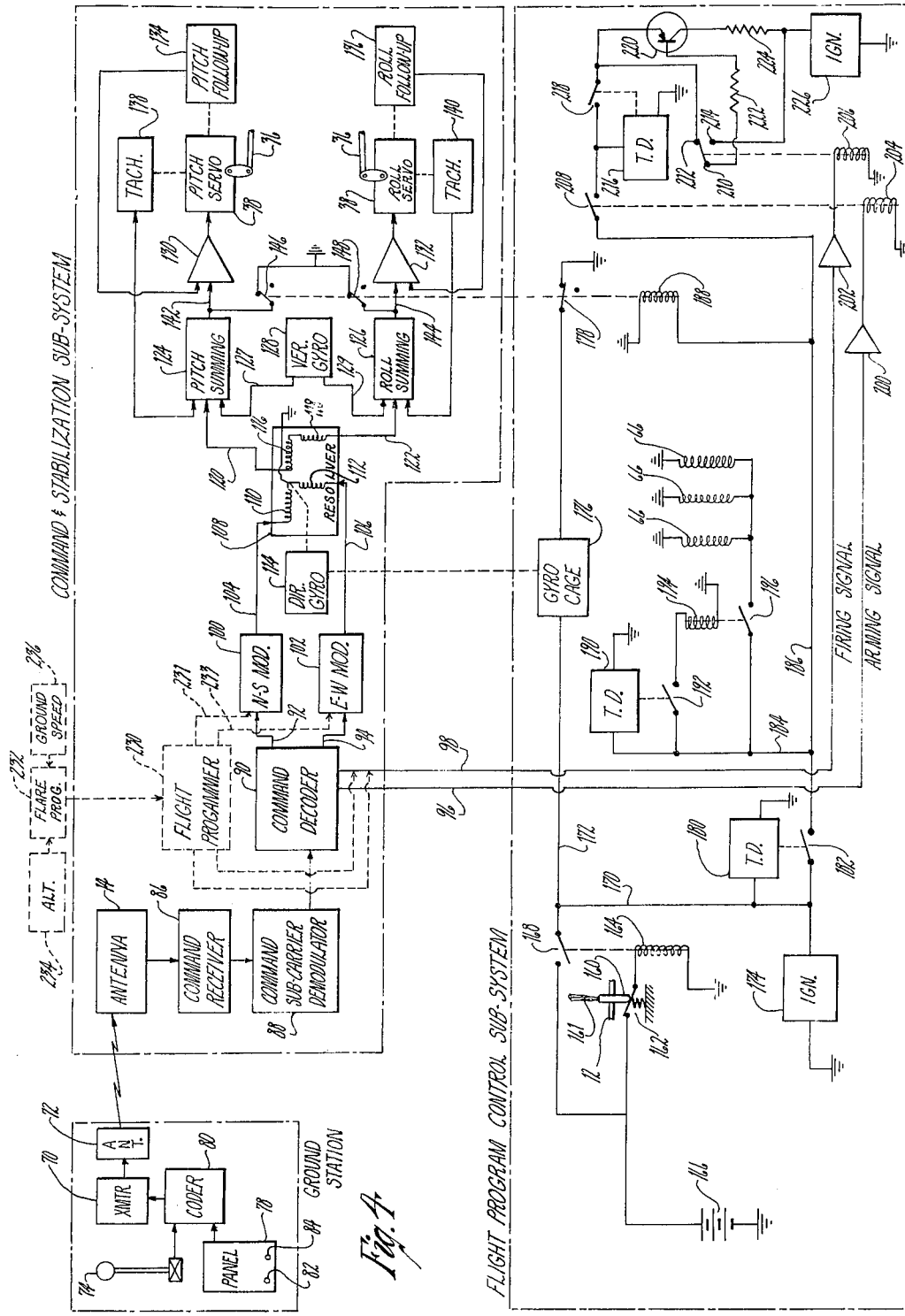

United States Patent Office 3,246,864
Patented Apr. 19, 1966

3,246,864
CONTROLLED FLIGHT AERIAL DEVICE WITH RETARDING ROTOR
Robert C. Mack, West Simsbury, Donald W. Robinson, Jr., Hazardville, and Bruce A. Goodale, Windsor, Conn., assignors to Kaman Aircraft Corporation, Bloomfield, Conn., a corporation of Connecticut
Filed June 25, 1963, Ser. No. 290,349
12 Claims. (Cl. 244—138)

This invention relates to aerial devices having retarding rotors for descending flight through the atmosphere, and deals more particularly with such a device wherein the rotor is controllable to vary the path, speed and other characteristics of the flight.

The particular embodiment of the invention described herein is in many respects similar to the device disclosed in the Lubben, Sampson and Robinson application Serial No. 129,776 entitled "Empennage Construction for a Space Missile," and is also in many respects similar to the device disclosed in the Hollrock application Serial No. 225,209, now U.S. Patent No. 3,143,323, entitled, "Aerial Device With Retarding Rotor." Reference is specifically made to these two latter applications for a more detailed description of the construction of the rotor and of the empennage of the device described herein, as the rotor and empennage of the device described herein are or may be substantially identical with those shown in said applications.

A device embodying the invention may be called a rotary blade parachute and it is adapted for the controlled safe delivery to the ground of supplies or equipment or an article or mechanism from an aircraft or otherwise from an elevated position. The device may be carried on an aircraft and released therefrom and said device may be connected to a container or body constituting or adapted to carry a useful load, but in these respects the invention is not necessarily limited. A device embodying the invention is adapted for use at various speeds including those in the supersonic range and it may be released at either a high altitude or a low altitude.

One object of the present invention is to provide an aerial device of the foregoing character which is controllable during flight to vary its flight path, speed and/or other flight characteristics so that it may be made to execute various flight maneuvers, land in a designated target area and/or strike the ground with a very low velocity.

Another object of this invention is to provide a control system for an aerial device of the type mentioned in the preceding paragraph which control system is readily adapted for use with command signals generated by a remote ground station a preset programming mechanism carried by the device or by sensors carried by the device.

Another object of this invention is to provide an aerial device of the type mentioned which is adapted to be dropped from an aircraft, or to otherwise enter the atmosphere, with its rotor blades in a folded condition and to thereafter have said blades and other parts deployed for controlled descending flight through the atmosphere under the dictation of command signals generated by a remote ground station or other source, the device including a control system for controlling in proper sequence the deployment of the rotor blades and other parts and the turning on of the flight control system.

A still further object of this invention is to provide, in an aerial device of the foregoing character having a rapid acting actuator for introducing a collective flare of the rotor blades just prior to landing, a highly responsive system for controlling the operation of said actuator whereby the collective flare is introduced almost immediately upon the recipt of a command signal, but which system is nevertheless insensitive to erroneous or stray signals similar to a command signal.

Other objects and advantages of the invention will be apparent from the following description and from the drawings forming a part hereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a diagrammatic view of a flight path of a device embodying the present invention.

FIG. 2 is a side elevational view of an aerial device embodying the present invention with part of the case being shown broken away to reveal the construction of interior parts, the solid lines showing the rotor blades and empennage arms in their deployed positions and the broken lines showing the same parts in their undeployed positions.

FIG. 3 is a sectional view through the universal joint connecting the rotor assembly to the load-carrying case, this view being taken on the line 3—3 of FIG. 2.

FIG. 4 is a schematic illustration in block diagram form of a system comprising part of the present invention for controlling various aspects of the deployment, flight and landing of the device shown in FIGS. 1, 2 and 3.

*General organization and flight pattern of aerial device, FIGS. 1, 2 and 3*

A typical flight pattern of an aerial device embodying the present invention is shown in FIG. 1. FIGS. 2 and 3 show the general organization or structure of the device. Referring to these figures, it will be noted that the device indicated generally at 10, includes a generally elongated load carrying body 12 which in the present case is provided with a hexagonal shape in transverse cross section. The nose of the body is rounded and may, as shown, carry an antenna 14 which may be used to receive radio control signals, as part of a radar altimeter, or for other purposes. As shown best in FIG. 2, the illustrated body includes an end wall 16 located at the rear end thereof and a transverse bulkhead 18 located some distance forwardly of the end wall 16. Supported by the end wall 16 and bulkhead 18 is a centrally located column 20 which extends longitudinally along the central axis of the body between the bulkhead and end wall and some distance rearwardly beyond the end wall. Forwardly of the bulkhead 18, the body defines a compartment 21 which may be used to carry a useful load as well as various control mechanisms hereinafter described.

For retarding the descent of the device through the atmosphere, the body 12 has a rotor assembly, indicated generally at 24, attached to its rear end. This rotor assembly may take various different forms, but in the illustrated case is shown to be generally similar to that shown in the above-mentioned Hollrock application, Serial No.

225,209, to which application reference is made for a more detailed description than the description made herein. For the purpose of this application, however, it should be noted that the rotor assembly 24 includes a rotor supporting part 26 which is universally connected with the outer or rear end of the column 20 by means of a universal joint whereby the part 26 may be tilted in any direction relative to the body about a common point fixed relative to the body and to the part. As shown in FIG. 3, this universal joint may consist of a cross-shaped member 28 having one pair of colinear arms rotatably connected with ears 30, 30 on the outer end of the column and another pair of colinear arms rotatably connected with inwardly extending bosses 32, 32 on the part 26. Also included on the rotor supporting part 26 are two arms 34, 34 which extend radially outwardly from the body of the part. Connected pivotally with the outboard end of each of the arms 34, 34 is a control link 36 which is disposed generally parallel to the central axis of the body and which extends into the body and has its forward end pivotally connected with the output arm of an actuator or servo motor 38, there being two servo motors 38, 38, each connected with a respective one of the links 36. As shown in FIG. 2, the two servo motors may be attached to and supported by the central column 20.

In addition to the part 26, the rotor assembly also includes a hub 40 which is supported for rotation relative to the part 26 about an axis fixed relative to said part and which axis is normally oriented generally parallel to or colinear with the central axis of the body. Equally circumaxially spaced about the hub are four blades 42, 42 each of which is connected at its inboard end to the hub for movement relative to the hub about an associated pivot axis located in a plane generally perpendicular to the axis of hub rotation, the degree of pivotal movement being such that the blades are movable between folded positions whereat the blades are disposed generally parallel to the axis of rotation and deployed positions whereat the blades extend generally radially outwardly from the axis of rotation. In FIG. 2 the folded positions of the blades are as shown by the broken lines and the deployed positions by the solid lines. The pivotal movement of the blades about these axes also permits the blades during flight to flap and to move to various different coning angles as determined by the speed of rotation and other factors. Synchronizer links 46, 46 connected with the blades and with an axially slidable member 48 synchronize the movements of the blades about their pivot axes so that the blades are deployed generally in unison and also flap or cone in substantial unison after deployment. The pivot axes about which the blades fold or cone are also movable relative to the hub member to change the pitch of the blades during the descending flight of the device, the pitches of the blades being controlled and synchronized by a vertically movable synchronizer 50 which maintains the pitches of the blades at such pitch angles, generally negative, as to cause autorotation and an optimum rotational speed of the blades.

In order to provide the device with the capability of making a soft landing, the rotor assembly further includes a means for effecting a collective flare maneuver just prior to the device striking the ground on landing. As used herein, the term "collective flare" refers to the act of quickly and collectively changing the pitches of the blades from their generally negative autorotational angles to positive angles. This in turn causes the high rotational speed and inertia of the rotor blades to be converted into an increased lifting force on the device, and if the maneuver is executed at the proper time or altitude, it can cause the device to strike the ground with almost zero velocity. In the illustrated rotor assembly, the means for producing this collective flare include two lifting arms 52, 52 which are connected at their lower ends to the pitch synchronizer 50 and at their upper ends to a vertically movable spider 54. During the major portion of the descending flight, the spider 54 occupies the position shown in FIG. 2, but just prior to landing it may be moved vertically from the illustrated position to cause the lifting arms 52, 52 to lift the synchronizer 50. The effect of the lifting of the synchronizer 50 is to collectively increase the pitches of all four blades by shifting the positions of their pivot axes and is explained in more detail in the above-referred to Hollrock application as are the means for effecting the movement of the spider. As shown in said application, the means for effecting the movement of the spider includes a cartridge powered actuator or thruster which is adapted to be operated or fired upon the receipt of an electrical firing signal.

In addition to the rotor assembly, the aerial device 10 includes an empennage assembly which aids in controlling its flight through the atmosphere. This empennage assembly, as illustrated, is identical with that shown in the above-referred to Lubben, Sampson and Robinson application, and for the present it is sufficient to note that it includes three arms 56, 56, each of which is pivotally connected with the body for movement between a radially outwardly extending deployed position as shown by the solid lines of FIG. 2, and a folded position parallel to the central axis of the body as shown by the broken lines of FIG. 2.

In FIG. 2 only two of the arms 56, 56 are shown, but it is to be understood that one other arm similar to that shown at the left in FIG. 2 is present in the device and hidden from view in FIG. 2. At the outboard end of each arm 56 is a fin 58. When the arms 56, 56 are in their folded positions, all three of the fins 58, 58 extend radially outwardly from the body and serve to stabilize movement of said body about its central axis as the body moves along a flight path generally parallel to the central axis. The fin 58 shown at the right in FIG. 2 is angularly fixed to its arm 56 while the other two fins 58, 58 are loosely connected, in the angular sense, to their associated arms 56, 56. When the arms 56, 56 are in their folded positions, the two loosely connected fins 58, 58 are held in the desired radially outwardly extending positions by associated holding or latch means carried by the body. When the arms 56, 56 are moved to the deployed positions, these holding means are released to allow the two fins to rotate or weathervane relative to their arms 56, 56. Each of the three arms 56, 56 is held in its deployed position by an associated strut 60 which is pivotally connected at one end with the arm and at the other end is pivotally connected with a slide 62 which rides along an associated track on the outer surface of the body, the slide being held in the forward or deployed position by an associated latch once such position is reached to prevent return movement of the associated arm 56. A shock cord or bungee 64 attached to the slide 62 draws the latter downwardly to the deployed position shown in FIG. 2 after the associated arm 56 is released from its folded position. As shown in FIG. 3, each arm 56 has associated therewith a solenoid operated device 66 which is operable to normally hold the arm 56 in its folded position and is operable in response to a received electrical command signal to release the arm for movement to its deployed position.

Returning to FIG. 1, this figure shows a flight path of an aerial device which may be assumed to be released from an airplane. In this case, the device travels initially in a generally horizontal path as shown at a in FIG. 1. At this time, and also prior to release of the device from the airplane, the blades and the empennage arms are in their respective folded positions. A short time after the release from the airplane, the rotor blades are deployed by the firing of a cartridge (or operation of some equivalent actuator) which releases a deployment latch that previously prevented rotation of the hub and maintained the blades in their folded position, such a latch being shown, for example, in said Hollrock application. The release of this latch causes a mechanical pre-coning of the blades which is followed by further coning action arising as a result of centrifugal forces as the blades begin to rotate. At *b* in FIG. 1, the rotor blades are shown in the process of being deployed and are at some point between their folded and fully deployed or operative positions. From FIG. 1 it will be understood that upon movement of the blades to their operative positions, the attitude of the case quickly shifts from the generally horizontal position shown at *a* and *b* to an approximately vertical position as shown at *c*.

As long as no tilting movement is applied to the rotor assembly by the flight control links 36, 36, the aerial device follows a flight path which is generally vertical and parallel to its longitudinal axis. That is, after the rotor is deployed, the missile will assume a vertical attitude as shown at *c* and will fall in a directly downward direction lengthwise of its longitudinal axis until other action is taken to cause the device to move out of such a flight path.

When it is desired to move the device out of its truly vertically descending flight path, the solenoid devices 66, 66 are operated to release the empennage arms 56, 56 for movement to their deployed positions, and the actuators 38, 38 are operated to cause the links 36, 36 to tilt the axis of rotation of the rotor relative to the body. This tilting of the rotor axis causes the device to leave its generally vertical flight path and to partake of a gliding movement in which the case moves in a generally sidewise direction while nevertheless retaining a generally vertical attitude. The appearance of the aerial device while traveling in such a glide path is shown at *d* in FIG. 1. While the device is in such a glide path, it will be noted that the one empennage arm 56 having the fixed fin 58 serves as a stabilizer for restraining movement of the missile case about its central axis, the other two fins partaking of a weathervaning movement and having no significant effect on the stability or flight of the device. Although FIG. 1 shows merely a straight glide path, it will be understood that during the gliding flight of the device the rotor assembly may be tilted in various different directions relative to the body to cause the device to move in various directions and at various different ground speeds, and that therefore the device may be guided toward a designated landing or target area or may be made to traverse a given predetermined flight path, such as a spiral, as dictated for example by an airborne flight programming mechanism.

It will also be apparent from FIG. 1 that as the device traverses the glide path, it may develop a substantial forward ground speed as well as a vertical speed. One of the features of the device is, however, that at the time of landing, both the forward ground speed and the vertical speed may be reduced to very low values to permit the device to strike the ground with almost zero speeds. To achieve the desired reduction in the forward and vertical speeds, the device as it approaches the ground may be first controlled to cause the rotor assembly to tilt rearwardly with respect to the body. This is referred to as "cyclic flare," as shown at *e* in FIG. 1, and causes a reduction in the forward ground speed of the device. As the ground speed approaches zero as a result of the cyclic flare, the missile tends to drop again in a purely vertical direction, and this time the inertia of the moving blades may be used to apply a sudden large lifting force to the device by executing a collective flare maneuver as described above. Such a collective flare maneuver is shown at *f* in FIG. 1.

When the device is landed in the vertical position as shown at *f*, the empennage arms 56, 56 serve as a turnover gear to hold the device in its generally vertical landing position.

As described in more detail hereinafter, various different means may be employed for controlling the flight of the device after it leaves the launch vehicle, or after its entry into the atmosphere from outer space, and for the purpose of illustration, FIG. 1 shows such a control device as including a remote ground-based station comprising a portable control console 68, a transmitter 70 and a transmitting antenna 72. The control console 68 includes a manually operable control lever 74 which has a normal vertical attitude and is capable of having its upper end inclined in various directions corresponding to the desired direction of flight for an aerial device launched in the vicinity of the ground station and within the vision of a ground operator. The ground control station operates to transform the mechanical movements of the lever 74 into command signals which are transmitted through the transmitter 70 and antenna 72 to a receiver and other control equipment carried in the body of the device, which latter equipment converts the received radio signals into signals operating the servo motors 38, 38. Also included in the remote control console 68 may be other elements, such as switches for example, for producing other command signals which are transmitted to the aerial device and there converted into command signals initiating such operations as cyclic flare, collective flare and the deployment of the empennage arms. Instead of control by means of signals transmitted to the aerial device from a remote station, the device may also be controlled entirely or in part by command signals generated entirely within the device as by a preset programming mechanism carried by the device, by condition sensors carried by the device or by a combination of condition sensors and preset programming units. For example, a simple programming unit could be controlled by a timer to effect the various different operations required in accordance with a definite time sequence. As another example, an altimeter could be used to control the various operations in accordance with the altitude of the device. In a rather effective type of control, a time programmed unit may be used to control the rotor deployment, the empennage deployment and the tilting of the rotor in the glide path, and an altimeter used to initiate and control the cyclic flare and collective flare maneuvers after the device reaches a predetermined low altitude. In a preferred type of control system as disclosed in more detail hereinafter, a time controlled programmer is used to control the rotor and empennage deployment, and thereafter a remote station is used to transmit guidance signals to the device for controlling its flight during the glide path and to control the cyclic flare and collective flare maneuvers.

*Guidance and function control system, FIG. 4*

In FIG. 4, the solid lines show in substantially block diagram form a system in accordance with the present invention for controlling the flight of the aerial device through the atmosphere. In this system, the flight path and cyclic and collective flare are controlled by signals transmitted to the device from a remote station, and other functions are controlled by a program control carried by the device. The blocks represented by broken lines indicate components which may be substituted for others, in accordance with other embodiments of the invention, to make the control of the device less dependent on, or even entirely independent of, control signals transmitted to the device from a remote control station.

Considering first the system as shown by the solid lines, this system may for convenience be divided into three major parts including a ground or other remotely located station, a command and a stabilization subsystem and a flight program control subsystem, the latter two subsystems being located in the body of the aerial device. In general, the function of the ground station is to generate and transmit to the command and stabilization subsystem signals controlling the flight path or direction of the device and other signals controlling the operation of the collective flare actuator. The command and stabilization subsystem in turn operates to receive the flight direction signals and to convert these signals to approproate movements of the two servo actuators 38, 38 to cause movement of the device in the desired direction by tilting the rotor assembly 24 relative to the body 12. This subsystem also converts other received signals into signals controlling the operation of the collective flare actuator. The flight program control subsystem operates to sequentially control the deployment of the rotor blades, the deployment of the empennage and the operation of the collective flare actuator. It also controls the turning on of the command and stabilization subsystem to make the latter responsive to received flight direction signals.

Considering in more detail the structure of the various major parts of the control system and first turning to the ground station, the type of control signal transmitted by this station to the aerial device may take various different forms, but in the illustrated system is comprised of a carrier signal which is frequency modulated by a pulse amplitude modulated subcarrier signal (a PAM/FM signal). Included in the ground station, as mentioned previously, is a control console such as that shown at 68 in FIG. 1 and which console includes a manually operable control lever 74 and a number of other input devices which may be in the nature of switches or pushbuttons and which in FIG. 4 are indicated as comprising a control panel 78. The specific structure of the control console of itself forms no part of the present invention, but for the purpose of this description it should be noted that the console 68 may be substantially identical with the similar unit shown in the copending application of Kendall, Mack and Wellock, Serial No. 773,964, filed November 14, 1958, now U.S. Patent No. 3,096,046, and entitled, "Remote Control of Robot Aircraft." In the control console shown by said latter application, the manually operable control lever, as may be the case in the present system, is connected with two pickups in the form of two potentiometers one of which is adjusted in accordance with the degree of inclination of the control lever in the north-south direction and the other of which is adjusted in accordance with the degree of inclination of the control lever in the east-west direction. The two potentiometers or other pickups adjusted by the flight control lever 74 and the various switches or pushbuttons of the control panel 78 serve as inputs to a command coder 80. The command coder 80 interrogates the pickups moved by the flight control lever 74 and also interrogates the various switches or pushbuttons of the control panel and transforms the information so obtained into repetitive trains of pulses wherein each pulse in each train has its amplitude determined in accordance with the value of an associated one of the inputs. For example, the third pulse in each train may be associated with the one of the switches of the control panel and have a high or low amplitude depending on whether such switch is open or closed. Another pulse of each train may be associated with the potentiometer or other pickup operated by inclination of the control lever 74 in the north-south direction and have its amplitude adjusted in accordance with the degree of such inclination.

For the purpose of discussion, the input signals transmitted to the command coder 80 by the movement of the flight control lever 74 may be referred to as flight control input signals and input signals provided by the switches or pushbuttons of the control panel 78 may be referred to as switching function input signals. There are two flight command input signals, one of which corresponds to the north-south oriented component of the desired flight direction and the other of which corresponds to the east-west oriented component of the desired flight direction. The number of switching function input signals provided depends on the number of switching functions to be controlled in the areial device and, although this number may vary, only two such switching function input signals are employed in the illustrated case, one being a signal for controlling the arming of the circuit for firing the collective flare actuator and the other being a signal controlling the actual firing of the latter actuator after the associated circuit is armed by the arming signal. The two switches or pushbuttons for controlling these two signals are shown generally at 82 and 84 in FIG. 1. The trains of pulses produced in the command coder are used to amplitude modulate a subcarrier signal (for example a 20 kc. signal) and the modulated subcarrier signal in turn used to frequency modulate a carrier signal (for example a 410 mc. signal), the latter functions being performed by the transmitter indicated at 70. The frequency modulated output signal of the transmitter 70 is in turn transmitted to the antenna 72 and by the latter device transmitted to the aerial device whose flight path is to be controlled.

The command and stabilization subsystem of the aerial device includes the antenna 14 which receives the frequency modulated signal transmitted by the ground-based antenna 72 and which transmits the received signal to a command receiver 86. The latter receiver demodulates the received frequency modulated signal and as an output produces an amplified signal which is a reproduction of the amplitude modulated subcarrier. This signal is in turn transmitted to a command subcarrier demodulator 88, the output of which is in the form of repetitive trains of pulses conforming to and substantially reproductions of the repetitive trains of pulses produced by the command coder 80. These pulses are then in turn transmitted to a command coder 90 which samples each pulse in each train and produces a plurality of output signals which are related to the amplitudes of respectively associated pulses. Since there are four pulses in each pulse train, there are four output signals associated with the command coder 90. These output signals are in the form of D.C. voltages and appear on lines 92, 94, 96 and 98, respectively. The signal appearing on the line 92 is a north-south command signal the voltage value of which is proportional to the north-south component of the desired flight direction and the signal appearing on the line 94 is an east-west flight direction command signal the voltage value of which is proportional to the east-west component of the desired flight direction. The signal appearing on the line 96 is an arming command signal and the signal appearing on the line 98 is a firing command signal. The two D.C. flight direction command signals appearing on the lines 92 and 94, respectively, are respectively transmitted by the lines 92 and 94 to a north-south command modulator 100 and an east-west command modulator 102. Each of these modulators operates to convert the received D.C. signal voltage into an A.C. output signal, the amplitude of which varies in accordance with the voltage of the D.C. input signal. The A.C. output from the north-south command modulator 100 appears on the line 104 and the A.C. output of the east-west command modulator appears on the line 106. These two latter outputs are in turn transmitted by the lines 104 and 106 to a resolver 108.

As shown schematically in FIG. 4, the resolver 108 includes a pair of coils 110 and 112 which are arranged at right angles to each other and which are mechanically positioned by an associated direction gyro 114 so as to be maintained in a particular orientation with respect to the magnetic north-south and east-west directions. More specifically, the directional gyro 114 operates to maintain the coils 110 and 112 so oriented that the axis of the coil 110 is disposed in the magnetic north-south direction and the axis of the coil 112 is disposed in the magnetic east-west direction. It will be understood that this orientation of the coils 110 and 112 is maintained by the direction gyro 114 regardless of the orientation of the body 12 of the aerial device within which the resolver and other parts of the control system are contained.

Also included in the resolver 108 is another pair of coils 116 and 118 which are disposed at right angles to each other and which are fixed relative to the body 12 of the aerial device. As will be evident from FIGS. 1, 2 and 3, the empennage arm 56 having the fixed fin 58 determines the forward direction or heading of the body 12 as the latter moves transversely to the ground throughout the flight path, such forward direction or heading being shown by the arrow in FIG. 3. That is, the empennage arm 56 with the fixed fin, throughout movement of the aerial device in the glide path, acts as a tail and is located in the trailing direction of the glide path movement. If the forward direction or heading of the body 12 is shown in FIG. 3, it will be noted that movement of the control link 36 associated with the arm 34 which extends to the right in FIG. 3 results in movement of the aerial device about a pitch axis extending transversely to the forward direction of flight, and movement of the control link 36 associated with the downwardly extending arm 34 in FIG. 3 controls movement of the aerial device about a roll axis parallel to the forward direction of flight. Therefore, as indicated in FIG. 3, one control rod 36 may be considered to be a pitch control element and the other control rod 36 a roll control element. In the resolver 108, the fixed coil 116 is oriented with its axis parallel to the roll axis or forward heading direction as indicated in FIG. 3 and the fixed coil 118 is oriented with its axis parallel to the pitch axis or perpendicular to the forward heading direction.

The two fixed coils 116 and 118 are inductively coupled with the magnetically oriented coils 110 and 112 and the value of the voltages induced in these coils will depend on the relative orientation of the two sets of coils as is well known. The resulting outputs of the resolver appearing on the lines 120 and 122 will be pitch and roll command signals, respectively, the values of which will be dependent on the flight direction input signals appearing on the lines 104 and 106 and which will also be dependent on the heading or orientation of the body 12. Due to the action of the resolver, their signals will be of the correct character to cause operation of the servo actuators 38, 38 and consequent tilting of the rotor assembly in the proper direction to cause movement of the aerial device in the desired direction as commanded by movement of the ground station manual control lever 74.

The pitch and roll command signals 120 and 122 are used as command signals for a generally conventional servo system which as shown includes two summing devices 124 and 126, a vertical gyro 128, two amplifiers 130 and 132, the servo actuators 38, 38, two position follow-up devices 134 and 136 each associated with a respective one of the servo actuators 38, 38 and two tachometers 138 and 140 each associated with a respective one of the servo actuators. Each of the summing devices 124 and 126 receives input signals from the resolver 108, the vertical gyro 128 and the associated tachometer 138 or 140, these signals being summed in a desired manner to produce an output signal appearing on the associated output line 142 or 144 which serves as the input to the associated amplifier 130 or 132. At this point it will be noted that the vertical gyro 128 has two outputs appearing on the lines 127 and 129. The signal appearing on the line 127 represents the pitch attitude of the body 12 and is fed into the pitch signal summing device 124 and the signal appearing on the line 129 represents the roll attitude of the body 12 and is fed into the roll signal summing device 126. Each amplifier 130 and 134 also includes as an input the output of the associated position follow-up device 134 or 136 and connected in parallel with the lines 142 and 144 are two switches 146 or 148 respectively. The two switches 146 and 148 are operated in unison and function to either ground or unground the associated lines 142 and 144. The normal positions of the switches 146 and 148 are as shown in FIG. 4 wherein the lines 142 and 144 are grounded. This grounding in turn grounds the associated inputs of the amplifiers 130 and 132 and prevents any command signals from being transmitted to said amplifiers. The switches 146 and 148 are maintained in the normal grounding positions shown prior to deployment of the aerial device and therefore prevent any operation of the servo actuators until such time as it is desired to have said actuators operated by command signals. Although command signals are prevented from reaching the amplifiers while the switches 146 and 148 remain in their grounding positions, the amplifiers 130 and 132 are nevertheless responsive to signals received by the follow-up devices 134 and 136 with the result that the servo actuators maintain the control rods 36, 36 in their neutral positions. After the switches 146 and 148 are moved to their ungrounded positions, the amplifiers, servo actuators, and other components are responsive to the signals emanating from the summing devices 124 and 126 and thereafter function to move the control rods 36, 36 in the manner required to achieve the desired direction of flight as commanded by the flight direction command signals.

The flight program control subsystem is shown at the bottom of FIG. 4 and operates upon release of the aerial device from the launching aircraft to sequentially control the functioning of various parts of the device. It also operates in response to the arming and firing command signals appearing on the lines 96 and 98 to arm and fire the collective flare ignitor. In the illustrated subsystem, the operation of the subsystem is initiated by a deployment pin 160 which is releasably connected with the body 12 and adapted to be pulled from the body by a lanyard or static cord 161 after the device is released from the aircraft. Associated with the deployment pin 160 is a spring biased switch 162 which is normally held by the pin 160 in its closed position against the force of its bias to complete a circuit energizing a relay coil 164 from a D.C. voltage source 166 which may, for example, be a 24-volt battery. Energization of the relay coil 164 holds in an open condition a pair of contacts 168 thereby preventing energization of other components of the flight program control subsystem by the battery 166.

Shortly after the aerial device is released from the aircraft, the static cord 161 pulls the deployment pin from the body 12 thereby opening the switch 162 and de-energizing the relay coil 164. This in turn closes the contacts 168 to cause the source voltage to be applied to the lines 170 and 172. The line 170 is connected through the blade deployment ignitor 174 to ground, and therefore as soon as the line 170 is energized, the ignitor 174 is operated or fired to release the blades of the rotor assembly for movement to their deployed positions. Similarly, the line 172 is connected through a gyro caging device 176 and through initially closed contacts 178 to ground so that as soon as the line 172 is energized by the pulling of the pin 160, the gyro cage 176 is operated to cage the directional gyro, this being done to prevent tumbling of or damage to the gyro during the initial phases of the descent.

Energization of the line 170 also causes energization of a time delay device 180 which operates to close an associated pair of contacts 182 after the running of a given delay period starting with the energization of the line 170. The time delay effected by the device 180 may be varied as desired, but for the purpose of the present discussion may be taken to be a 10-second delay. Therefore, 10 seconds after the pulling of the deployment pin 160, the time delay device 180 closes the contacts 182 causing the source voltage to be applied through the line 170 and switch 182 to two associated lines 184 and 186. Connected between the lines 186 and ground is another relay coil 188 which is energized simultaneously with the closing of the contacts 182. Associated with and operated by the relay coil 188 are the pairs of contacts 146, 148 and 178. Upon energization of the coil 188, the two contacts 146 and 148 are moved to their ungrounded positions thereby turning the command and stabilization system "on" insofar as permitting the servo actuators to be controlled by the received flight command signals. Energization of the coil 188 also shifts the position of the contacts 178 to open the circuit to the gyro caging device 176 to uncage the directional gyro and to thereby allow it to operate in its intended manner.

Application of the source voltage to the line 184 initiates operation of a second time delay device 190. Associated with the device 190 is a pair of contacts 192 and the operation of the device is such that immediately upon energization thereof the contacts 192 are closed and then reopened after the running of a given delay period which may in the illustrated case be taken to be 3 seconds. Therefore, immediately upon the energization of the device 190, the contacts 192 are closed. This in turn energizes a relay coil 194 to close a pair of contacts 196 to energize the three empennage solenoids 66, 66, thereby effecting release and deployment of the empennage arms 56, 56. Three seconds after the energization of the solenoids, the time delay device operates to reopen the contacts 192, thereby deenergizing the relay coil 194 and opening the contacts 196 to prevent battery drain by the solenoids 66, 66.

To summarize the operation of the flight program control subsystem up to this point, it will be noted that almost immediately after the release of the aerial device from the launching aircraft the deployment pin 160 is pulled. Immediately thereafter, the blade deployment ignitor is fired to start the deployment of the blades to their fully deployed position. This deployment of the rotor blades is performed in a matter of several seconds after the firing of the blade deployment ignitor, and upon such full deployment the attitude of the device quickly shifts from the generally horizontal attitude shown at $a$ in FIG. 1 to the generally vertical attitude shown at $c$ in FIG. 1. Ten seconds after the release of the device from the aircraft, and by which time the blades are fully deployed and the device in its vertical attitude, the empennage arms are released by operation of the time delay device 180 for movement to their deployed positions and the command and stabilization subsystem is turned "on" for operation in response to flight direction control signals. The empennage arms move to their deployed positions in a very short time and thereafter the device is ready for movement in a glide path and in such a direction as dictated by the flight direction control signals.

While the aerial device is in its glide path, its flight direction is controlled from the ground station by manual movement of the control lever 74 by a ground operator. In this manner the device may be guided toward a designated target area. As the device approaches the ground, the ground operator pushes the arming switch or pushbutton 82 on the control panel 78 to cause arming of the collective flare igniting circuit. As the device falls closer to the ground, the ground operator pulls back on or reverses the direction of the control lever 74 to cause the rotor assembly to tilt rearward relative to the direction of flight, thereby exerting a cyclic flare maneuver as shown at $e$ in FIG. 1 to reduce the forward velocity of the device. As the forward speed of the device does slow down due to the cyclic flare, the device again begins to drop in a substantially truly vertical direction and at this time, or when the device reaches a critical altitude as determined by the ground operator, the ground operator pushes the collective flare firing switch or pushbutton 84 on the control panel 78. This sends a signal to the aerial device causing the firing of the collective flare ignitor and this is followed by the pitches of the rotor blades being collectively increased in the positive direction to produce a collective flare maneuver which converts the rotor inertia of the blades into an increased lifting force and in turn causes the device to be landed on the ground with a very low vertical velocity if the collective flare is executed at the proper time.

As shown in FIG. 4, the components included in the flight program control subsystem for achieveing the arming and firing of the collective flare ignitor in response to signals appearing on the lines 96 and 98 include two amplifiers 200 and 202 and two associated relay coils 204 and 206. As will be evident from FIG. 4, an arming signal applied to the line 96 is amplified by the amplifier 200 to cause energization of the relay coil 204 and likewise a firing signal appearing on the line 98 is amplified by the amplifier 202 to cause energization of the relay coil 206. Associated with and operated by the relay coil 204 is a pair of normally open contacts 208 and associated with and operated by the relay coil 206 is a movable contact 210 which normally engages an associated contact 212 and which upon energization of the coil 206 is movable from the contact 212 to another contact 214.

When the relay coil 204 is energized by the appearance of an arming signal on the line 96, the contacts 208 are closed. This in turn energizes a time delay device 216 having associated therewith a normally open pair of contacts 218. After the running of a predetermined delay period, for example 3 seconds, the time delay device 216 operates to close the contacts 218. This closing of the contacts 218 in turn applies the positive source voltage to the emitter terminal of a PNP transistor 220 and through the closed contacts 212 and 210 and a resistor 222 applies the same positive source voltage to the base terminal of the transistor. The collector terminal of the transistor is connected through another resistor 224 and the collective flare ignitor 226 to ground. Therefore, the base-collector terminals are at this time reverse biased and no current will flow to the collective flare ignitor 226, the latter therefore remaining unoperated. Thereafter, upon the receipt of a firing signal on the line 98, the relay coil 206 is energized, switching the movable contact 210 from the contact 212 to the contact 214. This, it will be understood from FIG. 4, causes the collector-base terminals of the transistor 220 to be forwardly biased with the result that the transistor conducts to energize the collective flare ignitor 226. Accordingly, the colletcive flare ignitor 226 is operated immediately upon the receipt of a firing command signal to cause execution of the collective flare maneuver. The use of the arming circuit prevents firing of the collective flare ignitor by a spurious firing signal which could conceivably be generated or introduced to the firing circuit at an unwanted time during the descent of the aerial device. It will also be noted that after the application of the arming signal, the circuit is not fully armed until the running of the delay period provided by the delay device 216. This prevents the firing of the ignitor by spurious signals immediately after the application of the arming signal and allows the ground control operator to press the arming pushbutton on the control console some time prior to pressing the firing pushbutton without danger of the collective flare ignitor being operated at too high an altitude by a spurious signal occurring shortly after the depressing of the arming pushbutton.

As mentioned previously, the control system may take various different forms without departing from the broader aspects of the invention, and only one such form is shown by the solid lines of FIG. 4. As an alternative embodiment of the control system, the aerial device control could be made entirely independent of remote control signals by omitting the antenna 14, the command receiver 86, the command subcarrier demodulator 88 and the command coder 90 and by replacing these components with a flight programming device indicated generally by the broken line block 230. The flight programmer 230 may itself take various different forms and has two outputs appearing on lines 231 and 233 which are connected respectively to the north-south command modulator 100 and to the east-west command modulator 102. The outputs appearing on these lines are D.C. voltages and the flight programmer 230 operates to control these voltages in such a manner as to cause the aerial device to fly in a predetermined path. For example, the programmer may simply operate to maintain constant voltages on these two outputs, in which case the aerial device will be commanded to fly in a straight path or direction. Alternatively, for example, the flight programmer 230 may be a device, such as a motor driven potentiometer, for slowly varying the voltages appearing on the output lines in a predetermined manner and in such a way as to cause the aerial device to fly in a generally spiraling glide path. Also included in the flight programmer 230 are two additional outputs one of which is connected to the line 96 and the other of which is connected to the line 98. By means such as a timer within the flight programmer, the programmer may operate at a predetermined time after release of the device from the aircraft to apply arming and firing signals to the lines 96 and 98 to cause arming and firing of the collective flare ignitor.

Although the arming and firing signals provided by the flight programmer 230 may be generated by preset timers, it is generally desirable that the collective flare maneuver be initiated more precisely in accordance with the altitude of the device and for this purpose the flight programmer 230 may have associated therewith other components as indicated by the broken lines and comprising a flare programmer 232, a flare altimeter 234 and a ground speed sensor 236. The ground speed sensor 236 is, however, not entirely essential and may be eliminated if desired. Assuming operation without the ground speed sensor 236, the flare altimeter 234 operates to sense the altitude of the device and upon the device reaching a predetermined altitude delivers a signal to the flare programmer 232 initiating operation of the latter device. The flare programmer 232 may be a time controlled device and upon initiation of its operation produces signals which are transmitted to the flight programmer 230, these signals overriding the signals normally produced by the latter programmer. The signals produced by the flare programmer 232 are such as to first cause rearward tilting of the rotor assembly to execute a cyclic flare maneuver. After predetermined time delays, the flare programmer generates arming and firing signals which are or may be sent by lines not shown to the lines 96 and 98 respectively to cause arming and firing of the collective flare ignitor. The ground speed sensors 236 may be employed to achieve more accurate timing or execution of the collective flare maneuver. When this sensor is employed, the flare altimeter 234 is relied upon to initiate operation of the flare programmer 232 which operates to command a rearward tilting of the rotor assembly to cause a cyclic flare maneuver and consequent slowing down of the forward speed of the device. This cyclic flare maneuver is maintained until the ground speed sensor 236 determines that the forward speed is of a predetermined low value and when this determination is made, the ground speed sensor by means of a signal transmitted to the flare programmer 232 causes the application of a firing signal to the line 98, the line 96 having been previously supplied with an arming signal by suitable means.

Although the control system shown in FIG. 4 is adapted for use with an aerial device dropped from an aircraft or other launching vehicle, it will be understood that various other means than a static cord and deployment pin may be used to initiate operation of the system and to thereby render the same adaptable to entry of the device into the atmosphere by means other than launching from an aircraft. Also, although in the illustrated case the direction of flight is controlled by tilting the entire rotor assembly relative to the body, the important effect of this tilting is the consequent tilting of the rotor blade tip plane relative to the central axis of the body and, at least in connection with some of the aspects of this invention, this tilting of the rotor blade tip plane may be accomplished by means other than tilting the whole rotor assembly.

The invention claimed is:

1. An aerial device adapted to enter or to be launched into the atmosphere at a high elevation and having a rotor operable to retard its descent through the atmosphere, said device comprising a load-carrying body, a rotor supporting part universally connected with said body for universal movement relative to said body, a hub carried by said part and supported for rotation about an axis fixed relative to said part, a plurality of elongated rotor blades arranged circumaxially of said hub, means connecting the inboard end of each of said blades with said hub in such a manner that during a first portion of the flight of said device said blades extend generally radially outwardly from said axis of rotation and are at such pitch angles as to cause autorotation, means including an actuator for collectively increasing the pitches of said blades to the same extents in the positive direction after said first portion of the flight of said device and in response to operation of said actuator so as to convert the rotary inertia of said blades into an increased lift force, means carried by said body for controlling the operation of said actuator, and means connected between said body and said part for tilting said rotor supporting part relative to said body about two different axes to thereby universally vary the position of said axis of rotation relative to said body to vary the flight of said device.

2. A device as defined in claim 1 further characterized by said actuator being operable to collectively increase the pitches of said blades upon the receipt of a command signal, and said means carried by said body for controlling the operation of said actuator including means for receiving a signal transmitted from a remote station and for converting said signal into a command signal for said actuator.

3. A device as defined in claim 1 further characterized by said actuator being operable to collectively increase the pitches of said blades upon the receipt of a command signal, and said means carried by said body for controlling the operation of said actuator including an altimeter and means controlled at least in part by said altimeter for issuing a command signal to said actuator.

4. An aerial device adapted to enter or to be launched into the atmosphere at a high elevation and having a rotor operable to retard its descent through the atmosphere, said device comprising a load-carrying body, a rotor supporting part universally connected with said body for movement in various directions relative to said body about a common point fixed relative to both said body and said part, a hub carried by said part and supported for rotation about an axis fixed relative to said part, a plurality of elongated rotor blades arranged circumaxially of said hub, means connecting the inboard end of each of said blades with said hub in such a manner that during flight said blades extend generally radially outwardly from said axis of rotation and are at such pitch angles as to cause autorotation, means including a collective flare actuator for collectively increasing the pitches of said blades in the positive direction so as to convert the rotary inertia thereof into an increased lift force, means connected between said body and said part and including at least one flight control actuator for tilting said rotor supporting part relative to said body to thereby vary the position of said axis of rotation relative to said body to vary the flight of said device, and programming control means for operating said collective flare and flight control actuators in accordance with a predetermined program which program is initiated by a start signal received by said programming control means.

5. A device as defined in claim 4 further characterized by means carried by said body and including an altimeter, which means is operable to transmit a start signal to said programming control means when said device falls below a predetermined altitude.

6. A device as defined in claim 4 further characterized by means carried by said body for receiving a signal from a remote station and for converting said latter signal into a start signal for said programming control means.

7. An aerial device adapted to enter or to be launched into the atmosphere at a high elevation, said device comprising a load-carrying body having a central axis, a rotor connected with said body for retarding its descent through the atmosphere and including a plurality of blades rotatable relative to said body about an axis of rotation generally parallel to said central axis, an empennage structure connected with said body and including an arm having a stabilizing fin fixed thereto, said arm being movable from an undeployed position adjacent said body to a deployed position at which deployed position said arm and stabilizing fin serve to stabilize movement of said body about its central axis as said body traverses a glide path wherein said body moves in a direction generally transverse to said central axis, means for producing in said body two flight direction command signals each corresponding to the component of the desired flight direction in a respective one of two mutually perpendicular magnetic directions, means including a first servo actuator for tilting the tip plane of said rotor blades about a roll axis extending parallel to said empennage arm when said arm is in its deployed position, means including a second servo actuator for tilting said tip path plane about a pitch axis extending perpendicular to said empennage arm when said arm is in its deployed position, and means for converting said two flight direction command signals into two command signals transmitted to said first and second servo actuators to cause said servo actuators to tilt said tip path plane in the direction required to achieve flight of said body in said desired flight direction.

8. An aerial device as defined in claim 7 further characterized by said means for converting said two flight direction command signals including a resolver including two movable mutually perpendicular windings and two mutually perpendicular fixed windings inductively coupled with said movable windings, and means for maintaining said two movable windings oriented respectively in alignment with said two mutually perpendicular magnetic directions, one of said two fixed windings being oriented parallel to said pitch axis and the other of said fixed windings being oriented parallel to said roll axis.

9. In an aerial device adapted to enter or to be launched into the atmosphere at a high elevation, the combination comprising: a load-carrying body having a central axis, a rotor connected with said body and including a plurality of blades which are initially in folded positions relative to said body and which are movable to deployed positions at which they autorotate about an axis generally parallel to said central axis to slow the descent of said body through the atmosphere, means for retaining said blades in said folded positions and which means is operable in response to a given signal to release said blades for movement to their deployed positions, an empennage structure including at least one part which is initially in a folded position relative to said body and which is movable to a developed position at which it stabilizes movement of said body about said central axis as said body moves in a direction generally transverse of said central axis, means for retaining said at least one empennage part in said folded position and which means is operable in response to a given signal for releasing said part for movement to its deployed position, means including at least one actuator responsive to input signals of a given character for tilting the rotor blade tip path plane relative to said central axis to cause said body to traverse a glide path wherein said body moves generally transverse to said central axis, control means in said body for generating input signals for said at least one actuator to control said tilting of said rotor blade tip path plane, means initially preventing transmission of said input signals to said at least one actuator and which means is operable in response to a given signal to permit transmission of said input signals to said at least one actuator, and programming means responsive to a start signal for producing in a predetermined order a signal transmitted to said blade retaining means to effect release of said blades for movement to their deployed positions, a signal transmitted to said retaining means for said empennage part to effect release of said part for movement to its deployed position, and a signal transmitted to said means initially preventing the transmission of input signals to said actuator to cause said means to permit the transmission of said input signals to said actuator.

10. The combination defined in claim 9 further characterized by means operable in response to a given signal to collectively increase the pitches of said blades after the latter are deployed to convert the rotary inertia of said blades into an increased lifting force.

11. In an aerial device adapted to enter or to be launched into the atmosphere at a high elevation the combination comprising: a load-carrying body having a central axis, a rotor connected with said body and including a plurality of blades which are initially in folded positions relative to said body and which are movable to deployed positions at which they autorotate about an axis generally parallel to said central axis to slow the descent of said body through the atmosphere, means for retaining said blades in said folded positions and which means is operable in response to a given signal to release said blades for movement to their deployed positions, means including at least one actuator responsive to input signals of a given character for tilting the rotor blade tip path plane relative to said central axis to cause said body to traverse a glide path wherein said body moves generally transverse too said central axis, control means in said body for generating input signals for said at least one actuator to control said tilting of said rotor blade tip path plane, means initially preventing transmission of said input signals to said at least one actuator and which means is operable in response to a given signal to permit transmission of said input signals to said at least one actuator, and means responsive to a start signal for producing a signal transmitted to said blade retaining means to effect release of said blades for movement to their deployed positions, and a signal transmitted to said means initially preventing the transmission of input signals to said actuator to cause said means to permit the transmission of said input signals to said actuator

12. In an aerial device adapted to enter or to be launched into the atmosphere at a high elevation the combination comprising: a load-carrying body having a central axis, a rotor connected with said body and including a plurality of blades which are initially in folded positions relative to said body and which are movable to deployed positions at which they autorotate about an axis generally parallel to said central axis to slow the descent of said body through the atmosphere, means for retaining said blades in said folded positions and which means is operable in response to a given signal to release said blades for movement to their deployed positions, means including at least one actuator responsive to input signals of a given character for tilting the rotor blade tip path plane relative to said central axis to cause said body to traverse a glide path wherein said body moves generally transverse to said central axis, control means in said body for generating input signals for said at least one actuator to control said tilting of said rotor blade tip path plane, and means including an actuator responsive to a given signal to collectively increase the pitches of said blades to the same extents after the latter are deployed and after autorotation has been established to convert the rotary inertia of said blades into an increased lifting force.

(References on following page)

References Cited by the Examiner

UNITED STATES PATENTS

| | | | |
|---|---|---|---|
| 2,397,632 | 4/1946 | Stuart | 244—7.2 |
| 2,622,826 | 12/1952 | Prince | 244—7.2 |
| 2,684,213 | 7/1954 | Robert | 170—160.12 X |
| 2,706,097 | 4/1955 | Johnson | 244—138 |
| 2,836,383 | 5/1958 | Oleksij | 244—138.1 |
| 2,886,261 | 5/1959 | Robert et al. | 244—17.25 |
| 2,945,649 | 7/1960 | Metcalf | 244—138 |
| 3,096,046 | 7/1963 | Kendall | 244—17.13 |
| 3,098,445 | 7/1963 | Jackson | 244—17.15 X |
| 3,143,323 | 8/1964 | Hollrock | 244—138 |

FERGUS S. MIDDLETON, *Primary Examiner.*

RALPH D. BLAKESLEE, *Examiner.*